United States Patent
Cheung et al.

(10) Patent No.: US 11,267,279 B2
(45) Date of Patent: Mar. 8, 2022

(54) FABRIC PRINTING METHOD FOR PRODUCING SPARKLING FABRIC

(71) Applicant: Hasbro, Inc., Pawtucket, RI (US)

(72) Inventors: Man Kuen Cheung, Hong Kong (HK); Nga Man Chang, Hong Kong (HK); Sze Wing Ling, Hong Kong (HK)

(73) Assignee: Hasbro, Inc., Pawtucket, RI (US)

( * ) Notice: Subject to any disclaimer, the term of this patent is extended or adjusted under 35 U.S.C. 154(b) by 12 days.

(21) Appl. No.: 16/460,512

(22) Filed: Jul. 2, 2019

(65) Prior Publication Data

US 2020/0009901 A1 Jan. 9, 2020

Related U.S. Application Data

(60) Provisional application No. 62/694,708, filed on Jul. 6, 2018.

(51) Int. Cl.
*B44C 1/14* (2006.01)
*B44F 1/04* (2006.01)
(Continued)

(52) U.S. Cl.
CPC .............. *B44C 1/14* (2013.01); *B41J 3/4078* (2013.01); *B44F 1/02* (2013.01); *B44F 1/045* (2013.01); *B32B 3/10* (2013.01); *B32B 7/023* (2019.01); *B32B 15/04* (2013.01); *B32B 2250/03* (2013.01); *B32B 2451/00* (2013.01)

(58) Field of Classification Search
CPC .... B44F 1/02; B44F 1/045; B44C 1/14; B41J 3/4078; B32B 7/023; B32B 3/10; B32B 15/04; B32B 2250/03; B32B 2451/00; D06Q 1/00; D06Q 1/04; D06Q 1/12
See application file for complete search history.

(56) References Cited

U.S. PATENT DOCUMENTS 4,718,963 A * 1/1988 Poll .................. B44C 1/105
156/232
5,631,064 A 5/1997 Marecki
(Continued)

FOREIGN PATENT DOCUMENTS

| CN | 1932141 A | 3/2007 |
|---|---|---|
| CN | 101570942 B | 4/2011 |

(Continued)

OTHER PUBLICATIONS

CN101570942 Machine Translation via EPO.*
(Continued)

*Primary Examiner* — Laura C Powers
(74) *Attorney, Agent, or Firm* — DiBerardino McGovern IP Group LLC (57) ABSTRACT

A sparkling fabric includes: a fabric substrate; and a tri-layer adhered to the fabric substrate. The tri-layer includes: an adhesive layer that adheres the tri-layer to the fabric substrate; an exposed design layer; and a metal plating layer between the exposed design layer and the adhesive layer. The tri-layer is distributed as a plurality of separable and identifiable tri-layer pieces across the fabric substrate such that the distribution of tri-layer pieces has a density on the order of 15-25 pieces per centimeter squared (pcs/cm2) and a size of a piece is less than 1 millimeter (mm).

19 Claims, 12 Drawing Sheets

(51) Int. Cl.
*B44F 1/02* (2006.01)
*B32B 3/10* (2006.01)
*B32B 7/023* (2019.01)
*B32B 15/04* (2006.01)
*B41J 3/407* (2006.01)

(56) References Cited

U.S. PATENT DOCUMENTS

| | | | |
|---|---|---|---|
| 5,837,347 A | 11/1998 | Marecki | |
| 6,200,410 B1 | 3/2001 | Kukoff et al. | |
| 6,544,588 B2 | 4/2003 | Yamamori et al. | |
| 8,840,745 B2 | 9/2014 | Green | |
| 9,475,338 B2 | 10/2016 | Ohashi | |
| 9,499,937 B2 | 11/2016 | He et al. | |
| 9,604,247 B2 | 3/2017 | Grinberg et al. | |
| 10,000,888 B2 | 6/2018 | Oleary | |
| 2005/0126414 A1* | 6/2005 | Weiss | B41M 5/025 101/491 |
| 2007/0028836 A1 | 2/2007 | Cartabbia | |
| 2010/0208351 A1 | 8/2010 | Nofi et al. | |
| 2011/0250412 A1* | 10/2011 | Johnson | B41M 5/00 428/195.1 |
| 2013/0224447 A1* | 8/2013 | Ohashi | D06Q 1/12 428/196 |
| 2018/0105980 A1 | 4/2018 | Devidal | |
| 2018/0340098 A1* | 11/2018 | Tanabe | C09J 7/28 |

FOREIGN PATENT DOCUMENTS

| | | |
|---|---|---|
| CN | 101457492 B | 6/2011 |
| CN | 102926243 B | 6/2013 |
| CN | 105714583 A | 6/2016 |
| WO | 2016/189515 A1 | 12/2016 |

OTHER PUBLICATIONS

In Gyou Min, Korean Intellectual Property Office, International Search Report and Written Opinion, corresponding PCT Application No. PCT/US2019/040362, dated Oct. 25, 2019, 11 pages total.
Office Action & Search Report, counterpart Chinese Patent Application No. 201980045488.0, dated Sep. 15, 2021, 14 pages total (including partial English translation of 7 pages).

* cited by examiner

FABRIC PRINTING METHOD FOR PRODUCING SPARKLING FABRIC

CROSS REFERENCE TO RELATED APPLICATION

This application claims the benefit of U.S. Application No. 62/694,708, filed Jul. 6, 2018 and titled FABRIC PRINTING METHOD FOR PRODUCING SPARKLING FABRIC, which is incorporated herein by reference in its entirety.

TECHNICAL FIELD

This disclosure relates to a method of making a sparkling fabric and the sparkling fabric.

BACKGROUND

Prior techniques for creating fabric that sparkles use glitter, which can be applied or sprayed to the fabric to achieve sparkling effect. Glitter is made of an assortment of separate and identifiable reflective particles. The assortment is such that the particles reflect light at different angles. At least one flat surface of the particles is reflective and this surface has an extent that is fairly small and can be sub-millimeter (mm) in size. Typically, a particle of glitter has several layers, including a base layer onto which a reflective material such as aluminum is applied.

SUMMARY

In some general aspects, a fabric printing method includes: applying adhesive to a sparkling foil paper to form an adhesive base paper, pressing the adhesive base paper to a fabric to form a fabric laminate, cooling the fabric laminate until the adhesive dries, and removing the sparking foil paper from the fabric of the fabric laminate. The adhesive is applied to the sparkling foil paper by distributing the adhesive as a plurality of separable and identifiable adhesive pieces over an outer layer of the sparkling foil paper such that the distribution of pieces has a density on the order of 15-25 pieces per centimeter squared (pcs/cm2) and a size of a piece is less than 1 millimeter (mm). The adhesive base paper is pressed to the fabric by contacting the side of the adhesive base paper to which the adhesive has been applied with the fabric while maintaining the temperature of the adhesive above a melting point of the adhesive. The sparking foil paper is removed from the fabric of the fabric laminate such that the distribution of adhesive and the outer layer of the sparkling foil paper to which adhesive has been applied remain attached to the fabric in accordance with the adhesive distribution to thereby form a sparkling fabric.

Implementations can include one or more of the following features. For example, the method can also include receiving the sparkling foil paper, and the sparkling foil paper can include a design layer including a plurality of two-dimensional geometric forms, with a size of each of the geometric forms being larger than the largest size of the adhesive pieces and a density of the geometric forms being greater than the density of the distribution of adhesive pieces. The geometric form can be a circle, dot, or polygon such as a hexagon, or any combination of these shapes. The size of the geometric forms in the design layer of the sparkling foil paper can be about 1.5 mm or between about 1.0-2.0 mm, and the density of the geometric forms in the design layer of the sparkling foil paper can be about 70-80 pcs/cm$^2$. The design layer can be an embossed layer. The design layer can be a layer of geometric forms having a plurality of different colors.

The sparkling foil paper can be a multi-layer paper.

The distribution of pieces on the sparkling fabric can include a distribution of at least three different sizes of pieces as follows: a plurality of small-sized pieces, distributed in accordance with a highest density; a plurality of medium-sized pieces, distributed in accordance with a middle density; and a plurality of large-sized pieces, distributed in accordance with a lowest density. The highest density of the small-sized pieces can be about 9-12 pcs/cm$^2$; the middle density of the medium-sized pieces can be about 8-9 pcs/cm$^2$; and the lowest density of the large-sized pieces can be about 3-5 pcs/cm$^2$. The large-sized pieces on the sparkling fabric can have a geometric shape in the plane of the sparkling fabric that is distinct from a geometric shape of at least the small-sized pieces and the medium-sized pieces.

At least some of the pieces in the distribution of pieces on the sparkling fabric can have a geometric shape in the plane of the sparkling fabric that is distinct from a geometric shape of the other pieces in the distribution of pieces on the sparkling fabric.

The temperature of the environment of the adhesive base paper and the fabric while pressing the adhesive base paper to the fabric can be maintained above 140° C.

The fabric laminate can be cooled until the adhesive dries by storing the fabric laminate in at a temperature of about 60° C. to 80° C. environment for at least 12 hours.

The fabric can be made of satin.

The adhesive can be applied to the sparkling foil paper to form the adhesive base paper by applying the adhesive so that the adhesive covers about 30% of the outer layer of the sparkling foil paper.

The fabric printing method lacks an application of glitter to the fabric.

The adhesive can be made of 50% adhesive, 40% butanone, and 10% curing agent, by weight.

The adhesive can be applied to the sparkling foil paper by distributing the plurality of separable and identifiable adhesive pieces as a single layer over the outer layer of the sparkling foil paper.

The adhesive can be applied to the sparkling foil paper to form the adhesive base paper by: applying the adhesive to an embossing cylinder having a surface topography that is correlated with the distribution of adhesive that is applied to the outer layer of the sparkling foil paper to form a prepared embossing cylinder; and pressing the sparkling foil paper to the prepared embossing cylinder as the prepared embossing cylinder is continuously rotated in one direction so that the outer layer of the sparkling foil paper contacts the prepared embossing cylinder.

In other general aspects, a fabric laminate apparatus includes: an adhesive base paper, and a fabric to which the adhesive base paper is pressed. The adhesive base paper includes: sparkling foil paper including an outer layer and a design layer including a plurality of two-dimensional geometric forms; and adhesive distributed as a plurality of separable and identifiable adhesive pieces over the outer layer of the sparkling foil paper such that the distribution of pieces has a density on the order of 15-25 pieces per centimeter squared (pcs/cm2) and a size of a piece is less than 1 millimeter (mm). The size of the largest adhesive pieces is less than the size of the geometric forms in the design layer and the density of the distribution of pieces is less than a density of the geometric forms in the design layer.

The distributed adhesive is between the fabric and the sparkling foil paper and the fabric and adhesive base paper are held together by the distributed adhesive.

Implementations can include one or more of the following features. For example, the size of the geometric forms in the design layer can be about 1.5 mm and the density of the geometric forms in the design layer can be about 70-80 pcs/cm$^2$.

The outer layer can be an aluminum plating layer that covers the design layer. The sparkling foil paper further can include a cover layer opposite the outer layer and a releasing layer between the cover layer and the design layer. The cover layer can be made of polyethylene terephthalate.

The fabric can be a satin or a tricot.

The apparatus lacks glitter.

The adhesive distributed as the plurality of separable and identifiable adhesive pieces over the outer layer of the sparkling foil paper can be a single monolithic layer.

The adhesive distribution can cover about 25-35% of the outer layer of the sparkling foil paper.

The geometric forms in the design layer can have a plurality of different colors.

The distribution of adhesive pieces on the sparkling foil paper can include a distribution of at least three different sizes of pieces as follows: a plurality of small-sized pieces, distributed in accordance with a highest density; a plurality of medium-sized pieces, distributed in accordance with a middle density; and a plurality of large-sized pieces, distributed in accordance with a lowest density. The highest density of the small-sized pieces can be about 9-12 pcs/cm$^2$; the middle density of the medium-sized pieces can be about 8-9 pcs/cm$^2$; and the lowest density of the large-sized pieces can be about 3-5 pcs/cm$^2$. The large-sized adhesive pieces on the sparkling foil paper can have a geometric shape in the plane of the sparkling foil paper that is distinct from a geometric shape of at least the small-sized pieces and the medium-sized pieces.

At least some of the adhesive pieces in the distribution of adhesive pieces on the sparkling foil paper can have a geometric shape in the plane of the sparkling foil paper that is distinct from a geometric shape of the other pieces in the distribution of pieces on the sparkling foil paper. The adhesive pieces can lack separable and identifiable reflective particles. The geometric form can be or include one or more of a circle, a dot, and a polygon (such as a hexagon, square, or pentagon).

In other general aspects, a sparkling fabric includes: a fabric substrate; and a tri-layer adhered to the fabric substrate. The tri-layer includes: an adhesive layer that adheres the tri-layer to the fabric substrate; an exposed design layer; and a metal plating layer between the exposed design layer and the adhesive layer. The tri-layer is distributed as a plurality of separable and identifiable tri-layer pieces across the fabric substrate such that the distribution of tri-layer pieces has a density on the order of 15-25 pieces per centimeter squared (pcs/cm$^2$) and a size of a piece is less than 1 millimeter (mm).

Implementations can include one or more of the following features. For example, the fabric substrate can extend along a plane, the thickness of the tri-layer along a direction perpendicular to the plane can be less than 10 μm. The thickness of the exposed design layer can be less than 5 μm and the thickness of the metal plating layer can be less than 5 μm. The thickness of the tri-layer at each location on the plane can remain substantially within a range of acceptable thickness values, the range being less than 1 μm.

The fabric substrate can be a satin or a tricot.

The metal plating layer can include a layer of aluminum having a luster.

The sparkling fabric lacks glitter.

The distribution of the tri-layer can cover about 25-35% of the fabric substrate. The distribution of the tri-layer can include a distribution of at least three different sizes of tri-layer pieces as follows: a plurality of small-sized tri-layer pieces, distributed in accordance with a highest density; a plurality of medium-sized tri-layer pieces, distributed in accordance with a middle density; and a plurality of large-sized tri-layer pieces, distributed in accordance with a lowest density. The highest density of the small-sized tri-layer pieces can be about 9-12 pcs/cm$^2$; the middle density of the medium-sized tri-layer pieces can be about 8-9 pcs/cm$^2$; and the lowest density of the large-sized tri-layer pieces can be about 3-5 pcs/cm$^2$. The large-sized tri-layer pieces can have a geometric shape in the plane of the fabric substrate that is distinct from a geometric shape of at least the small-sized tri-layer pieces and the medium-sized tri-layer pieces.

The sparkling fabric that is made herein appears shiny and sparkling, and can be used for garments for fashion dolls, for example. The sparkling fabric has an appearance of glitter but lacks any glitter. Because glitter is not used in the creation or manufacturing of the sparkling fabric, the texture is more appealing and smooth and the sparkling fabric does not suffer from loss or removal of glitter from the fabric substrate during playing or transportation. Moreover, the resulting sparkling fabric can be made with a greater variety of sizes of sparkling pieces. Lastly, the sparkling fabric does not suffer from flammability issues that can be caused by glitter.

DETAILED DESCRIPTION

Figure 1:
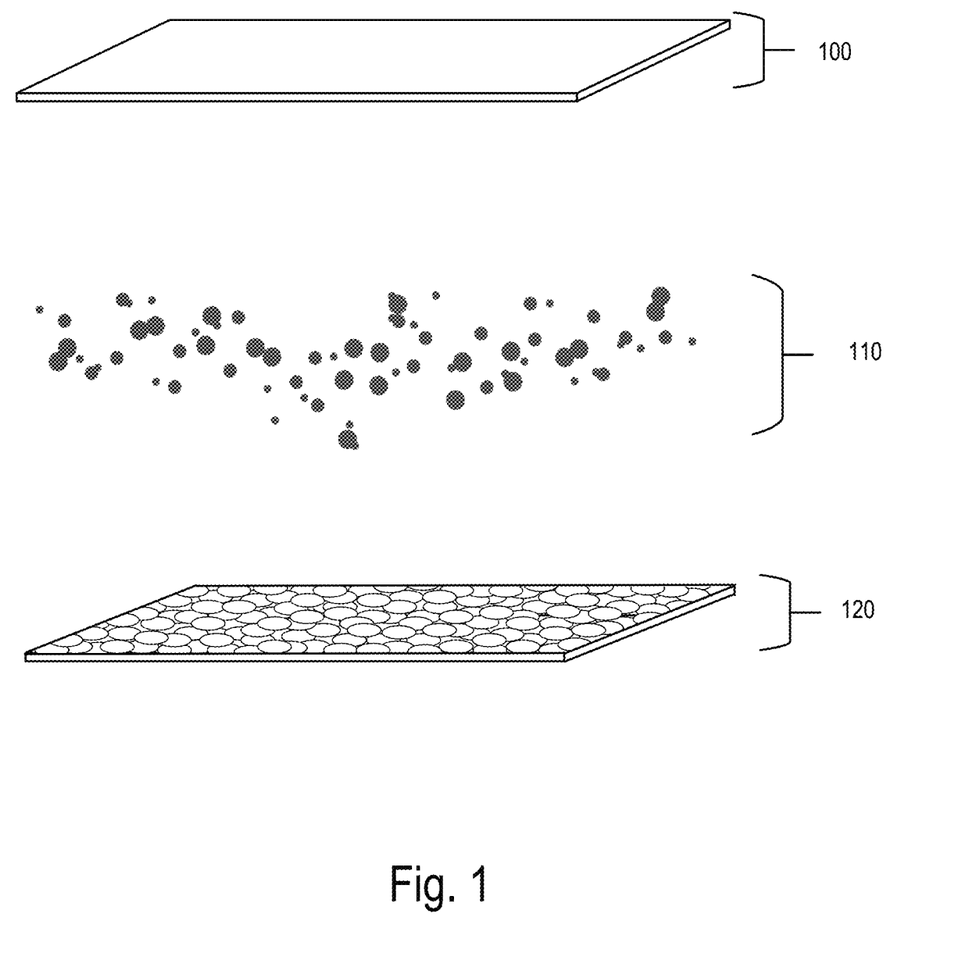
FIG. 1 is a schematic diagram of three materials, a fabric substrate, an adhesive material, and a sparkling foil paper, that make up a sparkling fabric that lacks any glitter.

Referring to FIG. 1, three materials, a fabric substrate 100, an adhesive material 110, and a sparkling foil paper 120, are processed to form a sparkling fabric that has a shiny and sparkling appearance without including any glitter.

Figure 2A:
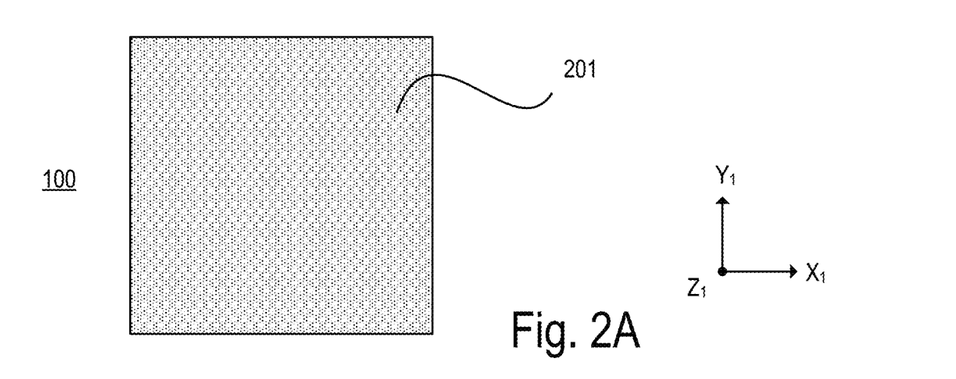
FIGS. 2A and 2C are respective plan views of a first side and a second side of the fabric substrate of FIG. 1.
Figure 2B:
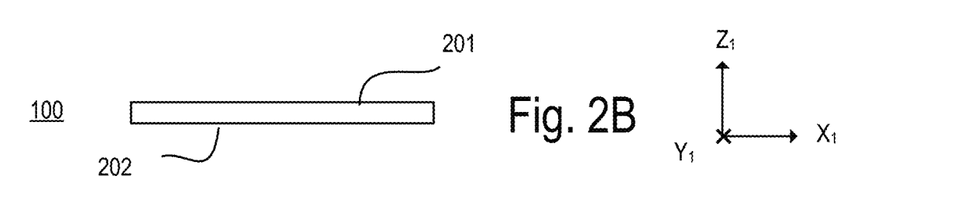
FIG. 2B is a plan view of a side wall of the fabric substrate of FIGS. 2A and 2C, the side wall extending from the first side to the second side of the fabric substrate.
Figure 2C:
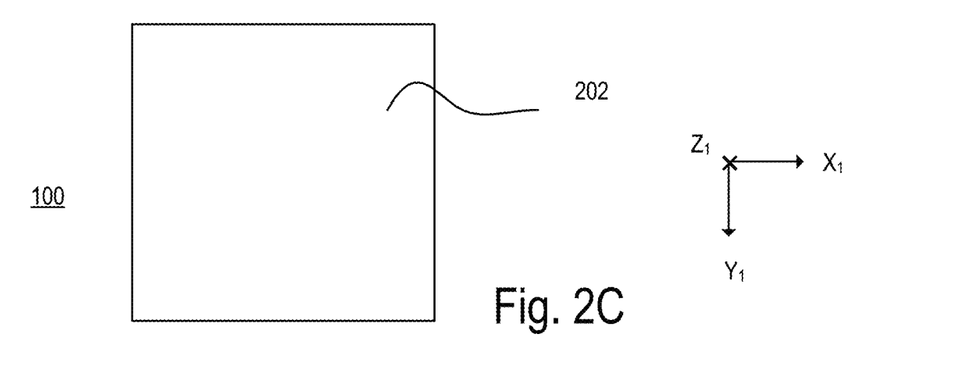

Referring also to FIGS. 2A-2C, the fabric substrate 100 includes a first side 201 that receives an adhesive base paper (and ultimately includes the sparkling design in the finished product); and a second side 202 opposite the first side 201. The fabric substrate 100 can be made of satin or tricot (for example, trilobal tricot). In some implementations, at least one of the first and second sides 201, 202 is shiny or glossy and the other side can is dull (that is, has very little gloss). The fabric substrate 100 generally extends along a plane (the $X_1Y_1$ plane in FIGS. 2A-2C, which is based on the $X_1Y_1Z_1$ coordinate system associated with the fabric substrate 100) and has a thickness (taken along a direction such as the $Z_1$ direction in FIGS. 2A-2C perpendicular to the plane) that is much smaller than the extent of the plane.

The adhesive material 110 is any substance (typically non-metallic) that is capable of bonding particles pulled from the sparkling foil paper 120 to the fabric substrate 100. The adhesive material 110 is in a liquid state when first applied in the process (as discussed below) and becomes a solid state after further curing, drying, or hardening. The adhesive material can be an organic substance and either naturally occurring and synthetic.

In some implementations, the adhesive material 110 is synthetic and is made of one or more polymers. In some implementations, the adhesive material 110 includes an adhesive polymer, butanone, and a curing agent. For example, the adhesive material 110 can be made of 50% polymer, 40% butanone, and 10% curing agent, by weight.

Referring also to FIGS. 3A-3D, the sparkling foil paper 120 includes a first side 321 that receives the adhesive material 110 (and ultimately is the side that faces the fabric substrate 100 in the finished product); and a second side 322 opposite the first side 321. The sparkling foil paper 120 generally extends along a plane (for example, the $X_2Y_2$ plane in FIGS. 3A-3D, which is in the $X_2Y_2Z_2$ coordinate system fixed to the sparkling foil paper 120) and has a thickness (taken along a direction such as the $Z_2$ direction in FIGS. 3A-3D perpendicular to the plane) that is much smaller than the extent of the plane. The overall thickness of the sparkling foil paper 120 can be in a range of about 30-40 μm.

Figure 3A:
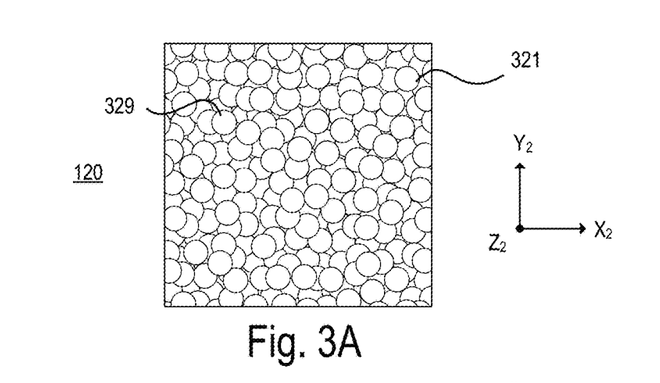
FIGS. 3A and 3C are respective plan views of a first side and a second side of the sparkling foil paper of FIG. 1.
Figures 3B, 3C:
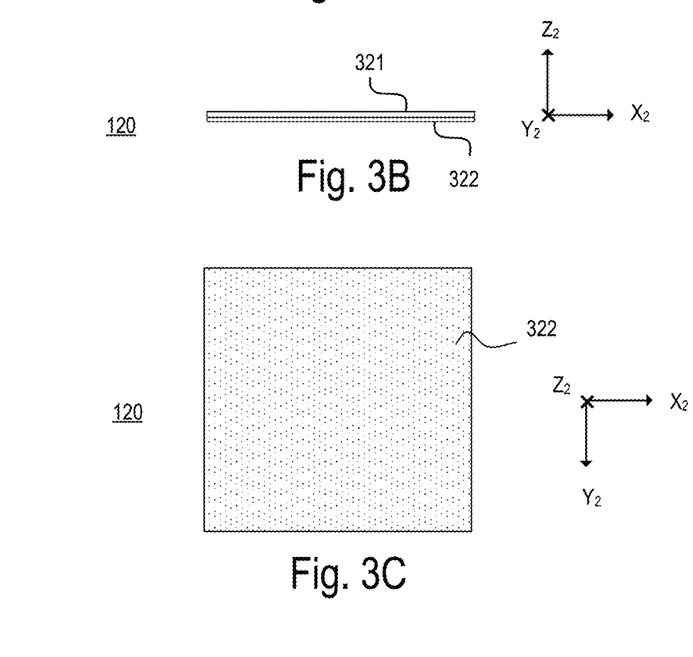
FIG. 3B is a plan view of a side wall of the sparkling foil paper of FIGS. 3A and 3C, the side wall extending from the first side to the second side of the sparkling foil paper.
Figure 3D:
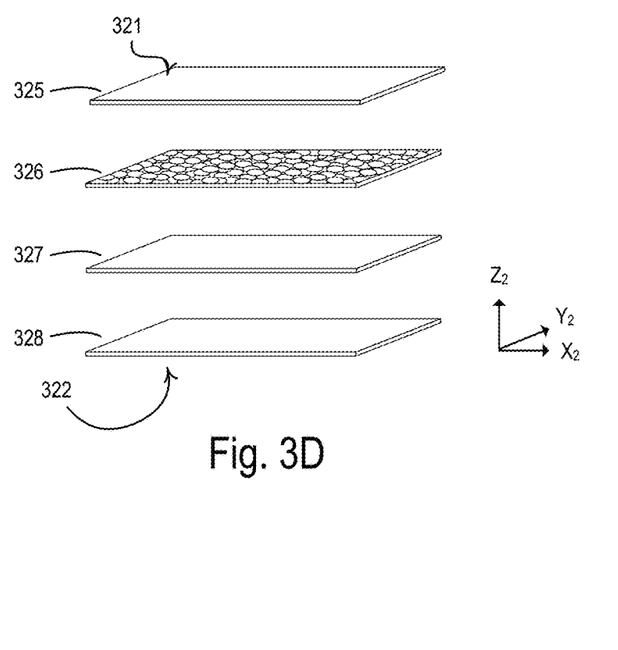
FIG. 3D is a perspective view of the sparkling foil paper of FIGS. 3A-3C, showing an exploded view of each of the distinct layers.
Figure 4A:
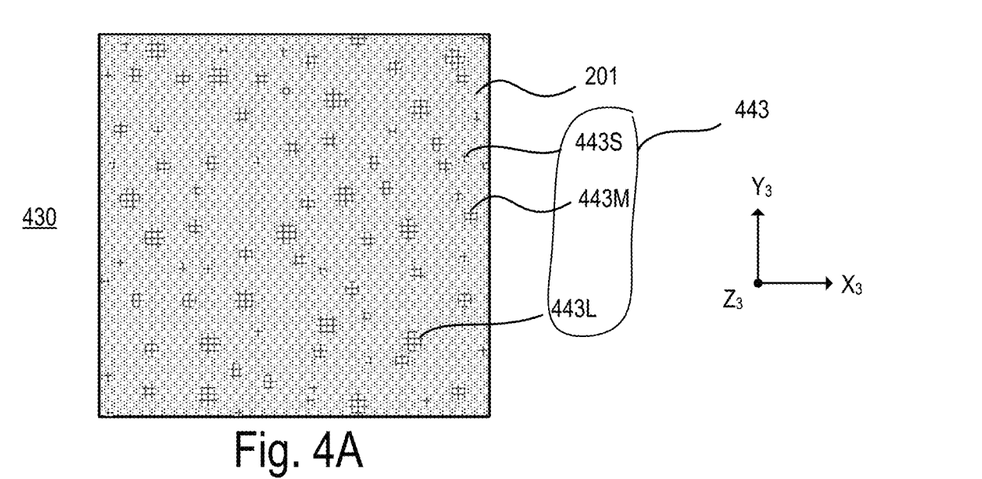
FIGS. 4A and 4C are respective plan views of a first side and a second side of the sparkling fabric formed by processing the three materials; the fabric substrate, the adhesive material, and the sparkling foil paper of FIG. 1.
Figure 4B:
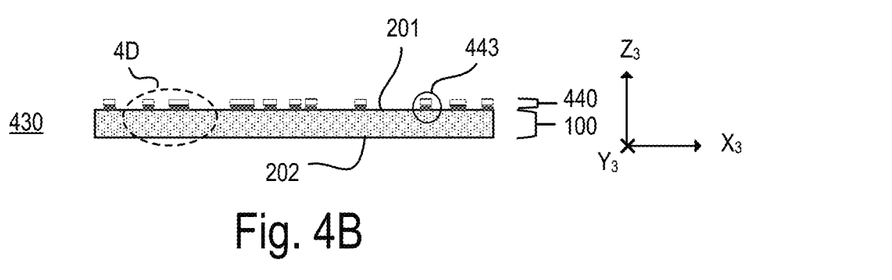
FIG. 4B is a plan view of a side wall of the sparkling fabric of FIGS. 4A and 4C, the side wall extending from the first side to the second side of the sparkling fabric.
Figure 4C:
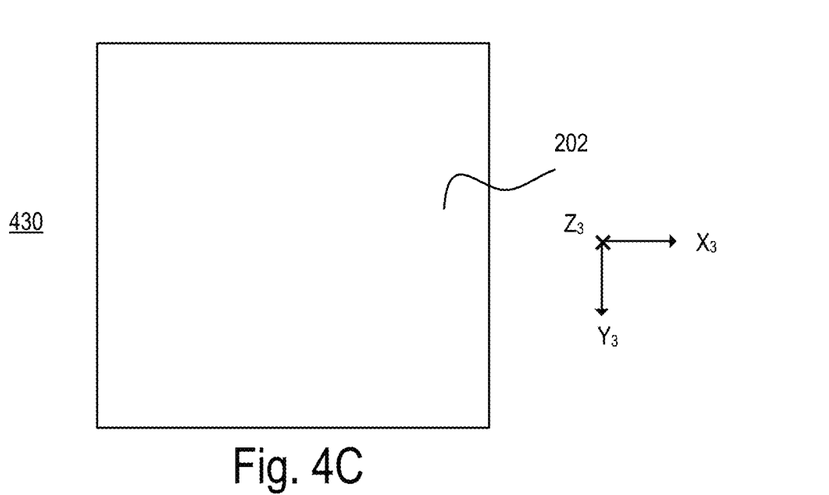
Figure 4D:
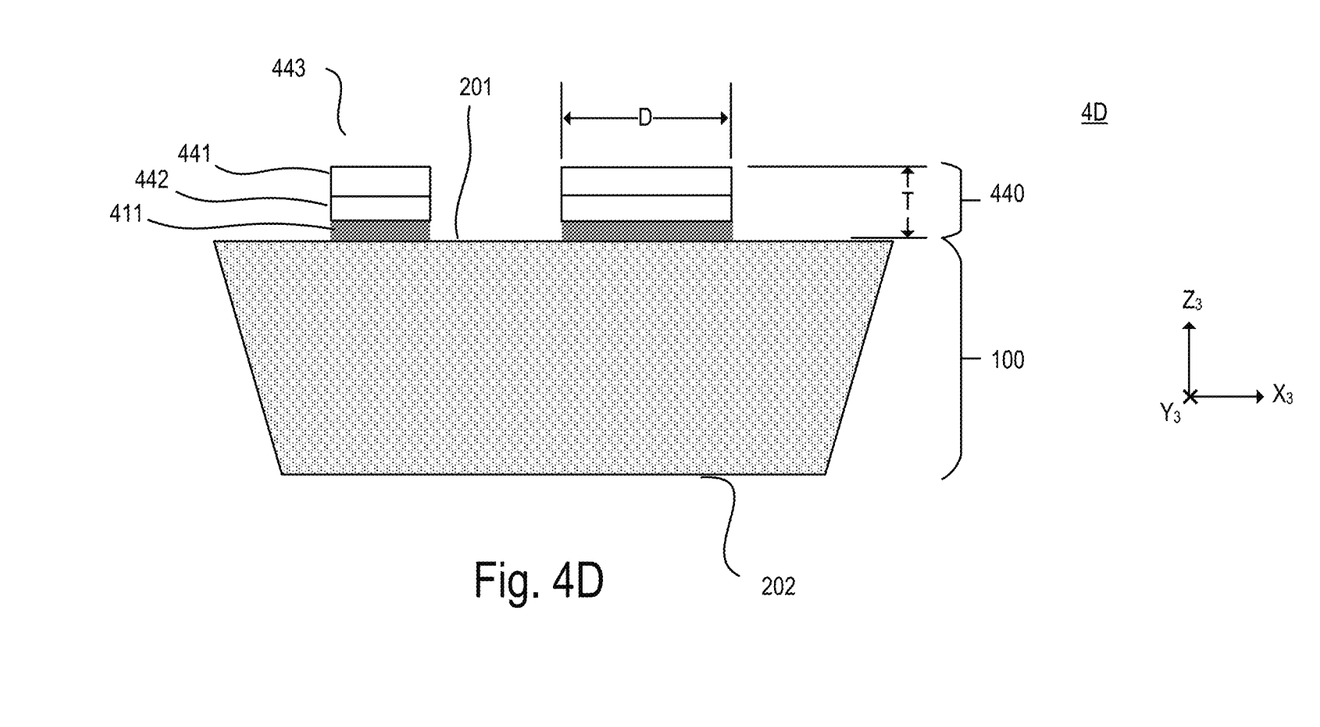
FIG. 4D is a plan view of the side wall of the sparkling fabric of FIG. 4B, showing view 4D.

As shown in FIG. 3D, the sparkling foil paper 120 includes a plurality of distinct layers. Specifically, the sparkling foil paper 120 includes an outer layer 325 at the first side 321, a design layer 326 adjacent the outer layer 325, a releasing layer 327 adjacent the design layer 326, and a cover layer 328 adjacent the releasing layer 327.

The outer layer 325 can be a metal plating layer that provides a metallic luster. The metal plating layer can be an aluminum plating layer. The outer layer 325 can have a thickness (taken along the $Z_2$ direction) of about 2-4 (for example, 3) μm.

The design layer 326 includes a plurality of two-dimensional geometric forms (for example, circles, dots, or polygons such as hexagons). As shown in FIG. 3A, the geometric forms are generally circles or dots and one of these circles 329 is labeled. The geometric forms can be overlapping (as shown in FIG. 3A), or non-overlapping. The density of the geometric forms (taken along the $X_2Y_2$ plane) and the size or extent of the geometric forms (taken along the $X_2Y_2$ plane) can be selected to ensure that the final sparkling fabric has a desired sparkle effect. In some implementations, the size or extent of the geometric form is on the order of millimeters (mm), for example, 1-3 mm or 1.5 mm. In some implementations, the density of the geometric forms is between about 60-90 pieces (pcs) per centimeter squared ($cm^2$) or about 70-80 pcs/$cm^2$. The design layer 326 can be an embossed layer, in which the geometric forms are raised in relief from a base surface. In some implementations, the geometric forms can have different colors (for example, some of the geometric forms can be a first color, while some of the geometric forms can be a second color). The design layer 326 can have a thickness (taken along the $Z_2$ direction) of about 2-5 μm.

The plurality of geometric forms of the design layer 326 can create a three-dimensional effect such as an appearance of a hologram. The design layer 326 can have a metallic luster and also have a gold color. The shape of the geometric forms can be irregular across the design layer 326, such as upon close inspection using a microscope. Thus, some of the geometric forms can have a first shape such as a circle while others in the same design layer 326 can be polygons.

The plurality of geometric forms of the design layer 326 can be a repeating pattern that includes a plurality of sub-designs that repeat across the extent of the design layer 326. For example, a sub-design can have an area of about 30×25 centimeters (cm) and include different sized two-dimensional geometric forms, such as about 800 largest-sized dots; about 1,000 middle-sized dots; and about 8,000 smallest-sized dots. As another example, a sub-design can have an area of about 30×25 centimeters (cm) and include different sized two-dimensional geometric forms, such as about 1,000 largest-sized dots; about 1,200 middle-sized dots; and about 12,000 smallest-sized dots.

The releasing layer 327 is any material or substance that enable the separation of the cover layer 328 from the design layer 326 during the process that forms the sparkling fabric.

The cover layer 328 provides a support for applying the adhesive 110 and then joining with the fabric substrate 100. Moreover, the cover layer 328 is removed from the design layer 326 during the process that forms the sparkling fabric. In some implementations, the cover layer 328 is made of polyethylene terephthalate (PET).

Referring to FIGS. 4A-4D, a sparkling fabric 430 is formed by processing the three materials; the fabric substrate 100, the adhesive material 110, and the sparkling foil paper 120. The sparkling fabric 430 includes the fabric substrate 100 and a tri-layer 440 adhered to the fabric substrate 100. The tri-layer 440 is made of an adhesive layer 411 that adheres the tri-layer 440 to the fabric substrate 100, an exposed design layer 441, and an outer layer 442 between the exposed design layer 441 and the adhesive layer 411. The tri-layer 440 is distributed as a plurality of separable and identifiable tri-layer pieces 443 across the first side 201 of the fabric substrate 100. Each tri-layer piece 443 therefore includes a piece of adhesive 110 upon which a piece of the outer layer 325 and a piece of the design layer 326 is formed. Therefore, the outer layer 442 is made up of the pieces of the outer layer 325 and the exposed design layer 441 is made up of the pieces of the design layer 326. And, the geometry, size, density, and distribution of these pieces is determined by how the adhesive 110 is applied during the process to form the adhesive layer 441, as discussed in detail below.

The distribution of the tri-layer pieces 443 across the first side 201 (and along the plane $X_1Y_1$ of the fabric substrate 100) can have a density on the order of 15-25 pcs/cm². Moreover, each tri-layer piece 443 has a shape that corresponds to a shape of the adhesive 110 in the adhesive layer 411. Thus, if the adhesive 110 pieces applied during the process are circular in form, then the tri-layer piece 443 will be approximately circular in form. The size or extent D of a tri-layer piece 443 (taken along the plane $X_1Y_1$ of the fabric substrate 100) can be less than 1 mm.

The thickness T of the tri-layer 440 taken along a direction perpendicular to the $X_1Y_1$ plane can be less than 10 μm. Moreover, the thickness T of the tri-layer 440 at each location on the $X_1Y_1$ plane of the first side 201 remains relatively constant; that is, it remains within an acceptable range of thicknesses. For example, such a range can be less than 1 μm, less than 0.5 μm, or less than 0.1 μm. The thickness of the exposed design layer 441 can be less than 5 μm and the thickness of the outer layer 442 can be less than 5 μm, taken along the direction perpendicular to the $X_1Y_1$ plane.

Importantly, the sparkling fabric 430 lacks glitter in that glitter is not used during any step of the process to form the sparkling fabric 430 and glitter is not present in the sparkling fabric 430.

Figure 5:
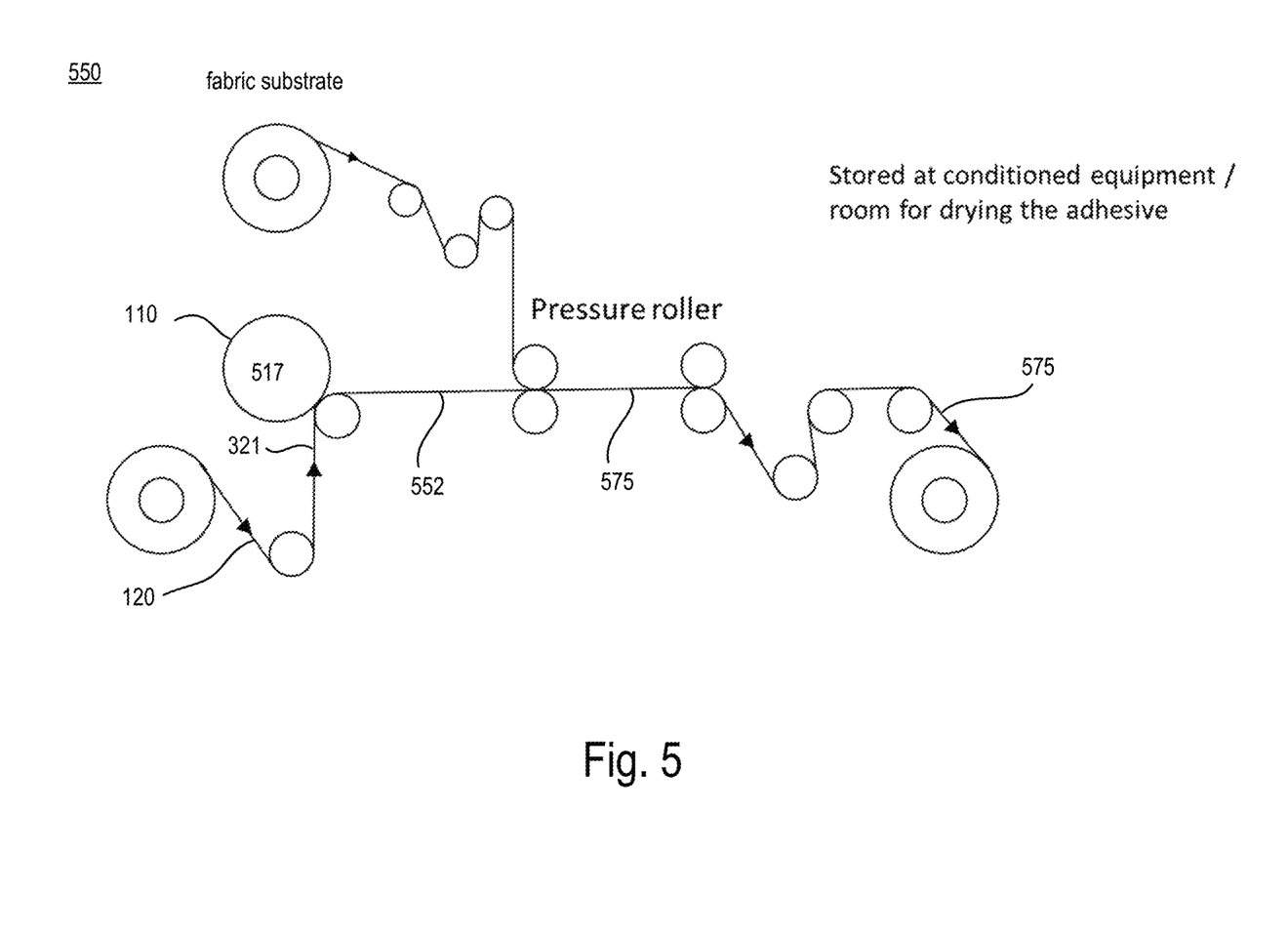
FIG. 5 is a schematic illustration of a first procedure performed for forming a fabric laminate apparatus.
Figure 6:
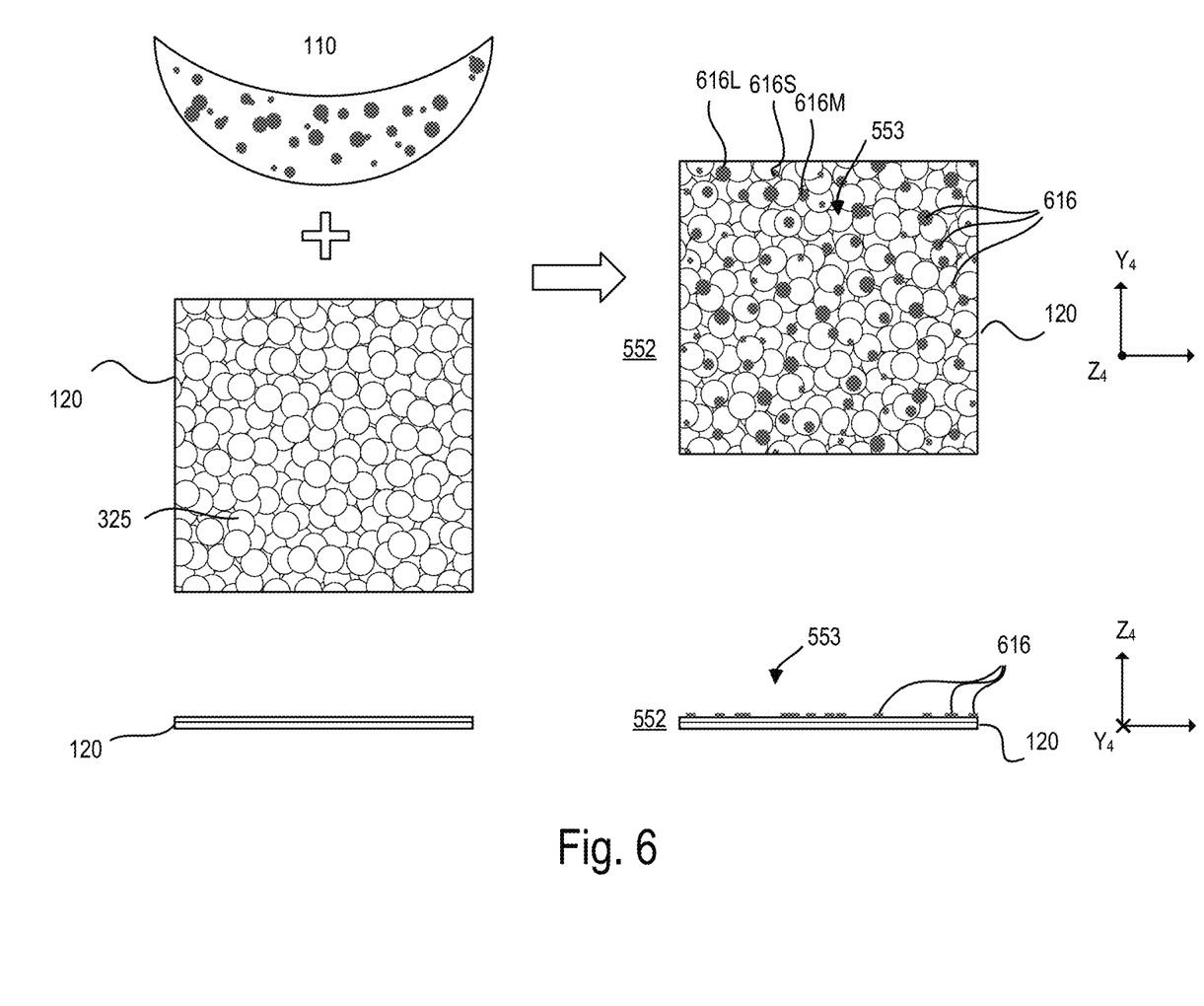
FIG. 6 is a schematic illustration of an implementation showing the application of the adhesive to the sparkling foil paper by distributing a plurality of separable and identifiable adhesive pieces over an outer layer of the sparkling foil paper.

Referring to FIG. 5, a first procedure 550 is performed for forming a fabric laminate apparatus 575. Initially in the first procedure 550 the adhesive 110 is applied to the sparkling foil paper 120 to form an adhesive base paper 552. Referring also to FIG. 6, the adhesive 110 is applied to the sparkling foil paper 120 by distributing the adhesive 110 as a plurality of separable and identifiable adhesive pieces 616 over the outer layer 325 of the sparkling foil paper 120. The distribution of the pieces 616 has a density on the order of 15-25 pieces per centimeter squared (pcs/cm2) and a size of a piece is less than 1 millimeter (mm) (taken along the $X_4Y_4$ plane of the adhesive base paper 552). The adhesive 110 can be distributed such that the pieces 616 cover about 25-35% of the area of the outer layer 325 of the sparkling foil paper 120.

The distribution of the adhesive pieces 616 on the sparkling foil paper 120 can include a distribution of at least three different sizes of pieces 616 as follows. The distribution can include a plurality of small-sized pieces 616S and these small-sized pieces 616S can be distributed in accordance with a highest density across the sparkling foil paper 120. The distribution can include a plurality of medium-sized pieces 616M, which can be distributed in accordance with a middle density across the sparkling foil paper 120. The distribution can include a plurality of large-sized pieces 616L, which can be distributed in accordance with a lowest density across the sparkling foil paper 120. The highest density of the small-sized pieces 616S is, for example, about 9-12 pcs/cm2; the middle density of the medium-sized pieces 616M is, for example, about 8-9 pcs/cm2; and the lowest density of the large-sized pieces 616L is, for example, about 3-5 pcs/cm2.

The large-sized adhesive pieces 616L on the sparkling foil paper 120 can have a geometric shape in the plane $X_4Y_4$ of the sparkling foil paper 120 that is distinct from a geometric shape of at least the small-sized pieces 616S and the medium-sized pieces 616M. For example, some pieces 616 can be circles or dots and others can be polygons (such as hexagons). To put it another way, at least some of the adhesive pieces 616 in the distribution of adhesive pieces on the sparkling foil paper 120 have a geometric shape in the plane of the sparkling foil paper that is distinct from a geometric shape of the other pieces in the distribution of pieces on the sparkling foil paper.

The adhesive pieces 616 lack glitter (that is, separable and identifiable reflective particles).

The adhesive 110 can be applied to the sparkling foil paper 120 to form the adhesive base paper 525 by applying the adhesive 110 to an embossing cylinder having a surface topography that is correlated with the distribution of adhesive 110 that is applied to the outer layer 325 of the sparkling foil paper 120 to form a prepared embossing cylinder 517. The sparkling foil paper 120 is pressed to the prepared embossing cylinder 517 as the prepared embossing cylinder 517 is continuously rotated in one direction so that the outer layer 325 of the sparkling foil paper 120 contacts the prepared embossing cylinder 517.

Figure 7:
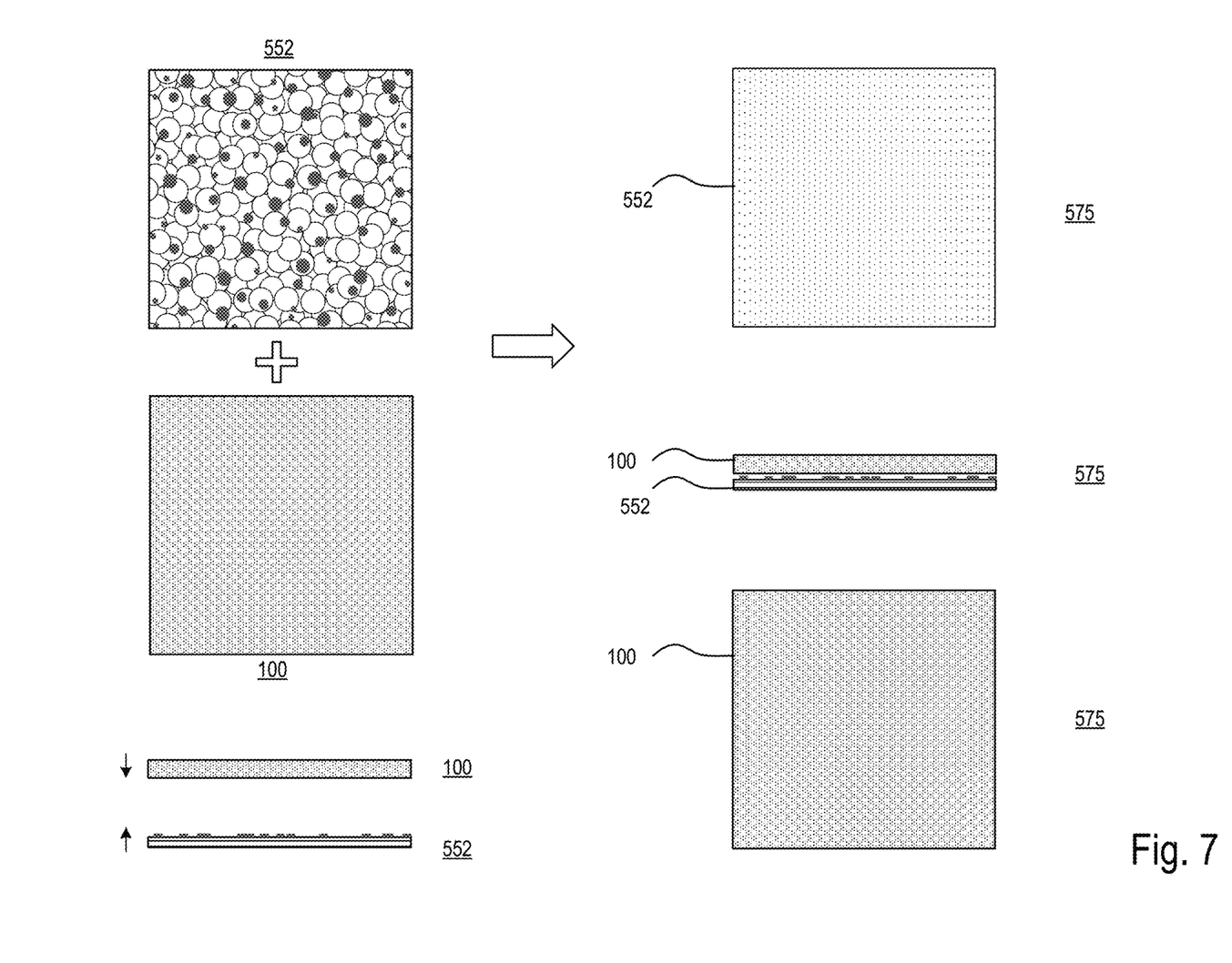
FIG. 7 is a schematic illustration of an implementation showing the adhesive base paper being pressed to the fabric substrate to form the fabric laminate apparatus.

Next, and with reference also to FIG. 7, the adhesive base paper 552 is pressed to the fabric substrate 100 to form a fabric laminate apparatus 575. The adhesive base paper 552 is pressed to the fabric substrate 100 by contacting a side 553 of the adhesive base paper 552 to which the adhesive 110 (in the form of pieces 616) has been applied with or to the fabric substrate 100 while maintaining the temperature of the adhesive 110 above a melting point of the adhesive 110. For example, the temperature of the adhesive 110 can be maintained above or heated above about 140-170° C. while the adhesive base paper 552 is being pressed to the fabric substrate 100.

The fabric laminate apparatus 575 is cooled until the adhesive 110 (in the pieces 616) dries. The fabric laminate apparatus 575 can be cooled until the adhesive 110 (in the pieces 616) dries by storing the fabric laminate apparatus 575 in at a temperature-controlled environment of about 60° C. to 80° C. for at least 12 hours (for example, for 24 hours).

Figure 8A:
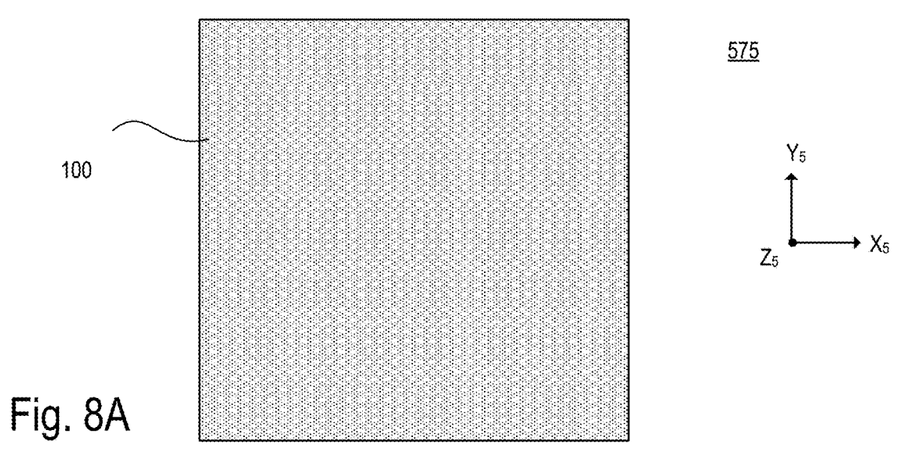
FIGS. 8A and 8C are respective plan views of a first side and a second side of the fabric laminate apparatus formed using the first procedure of FIG. 5.
Figure 8B:
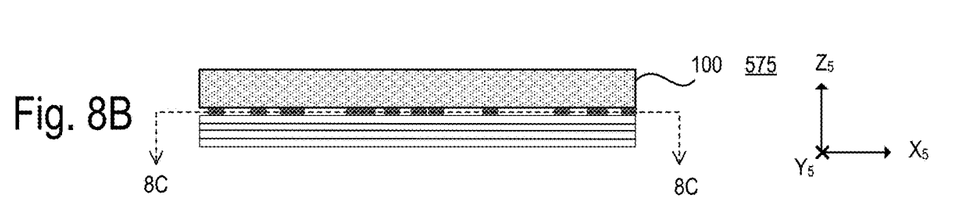
FIG. 8B is a plan view of a side wall of the fabric laminate apparatus of FIGS. 8A and 8C.
Figure 8C:
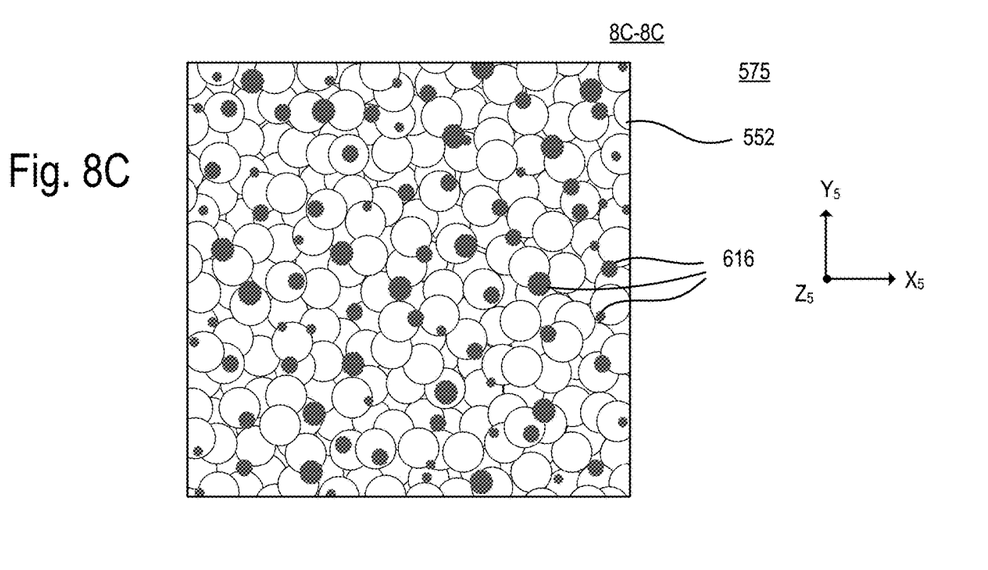

Referring also to FIGS. 8A-8C, the fabric laminate apparatus 575 therefore includes the adhesive base paper 552 and the fabric substrate 100. The adhesive base paper 552 includes the sparkling foil paper 120 having the outer layer 325 and the design layer 326 including the plurality of geometric forms 329. Moreover, the adhesive 110 is distributed as the plurality of separable and identifiable adhesive pieces 616 over the outer layer 325 of the sparkling foil paper 120 such that the distribution of the piece 616 is on the order of 15-25 pcs/cm² and the size of each piece 616 is less than 1 mm. The size of the largest adhesive pieces 616 is less than the size of the geometric forms 329 in the design layer 326 and the density of the distribution of pieces 616 is less than a density of the geometric forms 329 in the design layer 326. The adhesive base paper 552 is pressed to the fabric substrate 100 such that the distributed adhesive pieces 616 are between the fabric substrate 100 and the sparkling foil paper 120 and the fabric substrate 100 and the adhesive base paper 552 are held together by the distributed adhesive pieces 616.

The adhesive 110 is distributed as the plurality of pieces 616 over the outer layer 325 of the sparkling foil paper 120 in a single monolithic layer.

Figure 9:
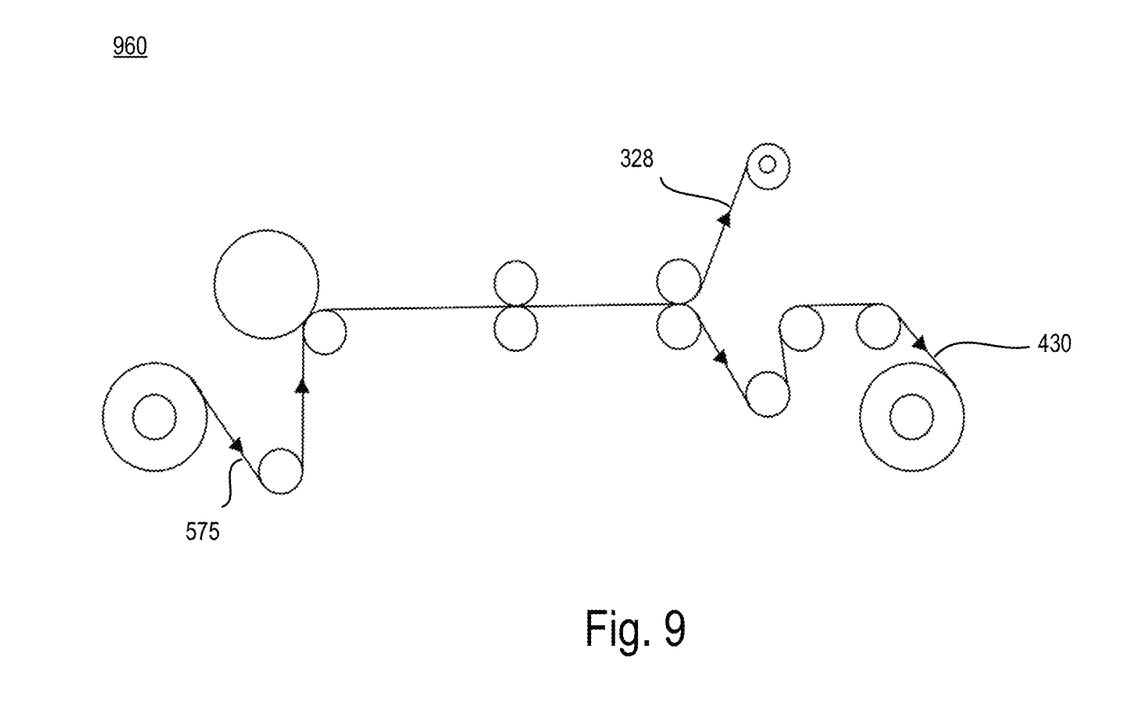
FIG. 9 is a schematic illustration of a second procedure performed on the fabric laminate apparatus.
Figure 10:
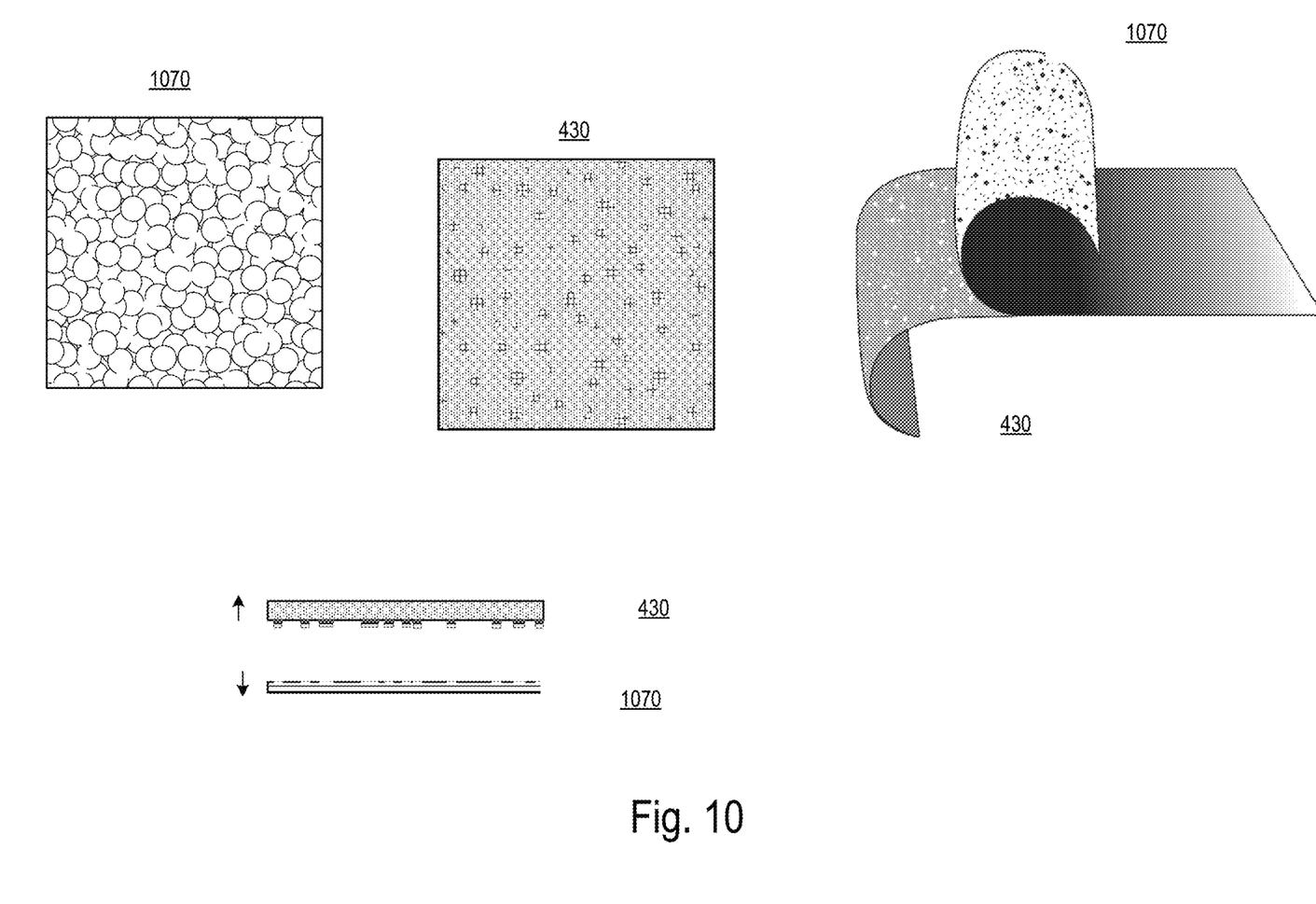
FIG. 10 is a perspective view showing a cover layer of the sparking foil paper being removed from the rest of the fabric laminate apparatus such that the distribution of adhesive pieces and the outer layer of the sparkling foil paper to which adhesive pieces have been applied remain attached to the fabric substrate in accordance with the adhesive distribution to thereby form the sparkling fabric.

Referring to FIG. 9, a second procedure 960 is performed on the fabric laminate apparatus 575. Referring also to FIG. 10, the cover layer 328 of the sparking foil paper 120 is removed from the rest of the fabric laminate apparatus 575 such that the distribution of adhesive pieces 616 and the outer layer 325 of the sparkling foil paper 120 to which adhesive pieces 616 have been applied remain attached to the fabric substrate 100 in accordance with the adhesive distribution to thereby form the sparkling fabric 430. The portion 1070 of the sparkling foil paper 120 that lacks adhesive pieces 616 is removed from the rest of the fabric laminate apparatus 575 when the cover layer 328 is removed because these portions are not adhered to the fabric substrate 100.

The second procedure 960 can also include maintaining the temperature of the environment of the adhesive base paper 552 and the fabric substrate 100 while pressing the adhesive base paper 552 to the fabric substrate 100, and this temperature can be maintained above 140° C.

Figure 11:
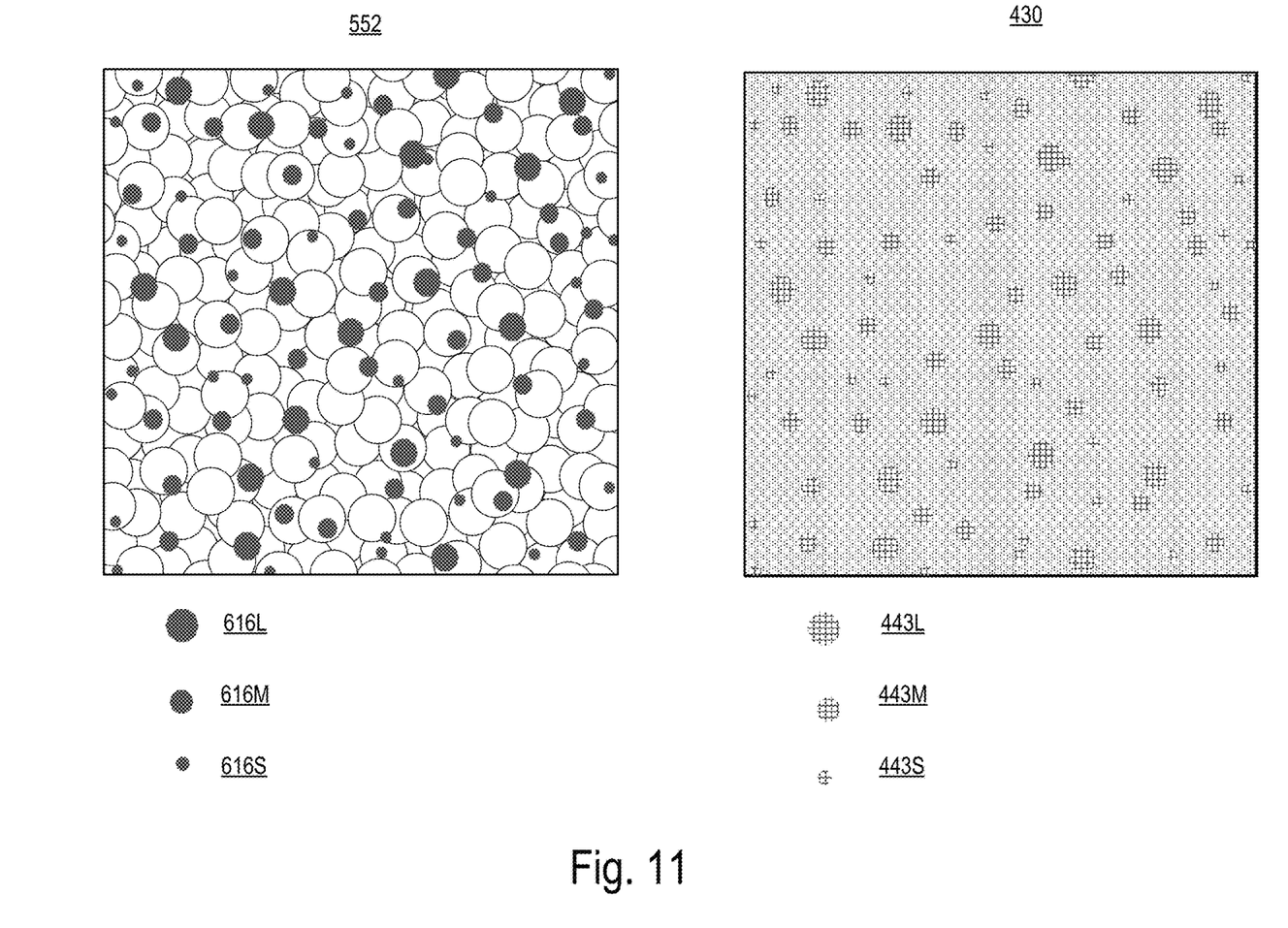
FIG. 11 is a schematic illustration of an example of the adhesive base paper and a sparkling fabric showing that a distribution of tri-layer pieces in the sparkling fabric is determined by a distribution of the adhesive pieces on the sparkling foil paper.

Referring again to FIGS. 4A-4D, the sparkling fabric 430 that results from the first and second procedures 550, 960, respectively, has certain characteristics. The distribution of the tri-layer pieces 443 (in the tri-layer 440) covers about 25-35% of the fabric substrate 100. Moreover, the distribution of the tri-layer pieces 443 is directly determined by the distribution of the adhesive pieces 616 on the sparkling foil paper 120, as shown in FIG. 11.

The distribution of the tri-layer pieces 443 includes a distribution of at least three different sizes of tri-layer pieces as follows. The distribution includes a plurality of small-sized tri-layer pieces 443S, distributed in accordance with a highest density; a plurality of medium-sized tri-layer pieces 443M, distributed in accordance with a middle density; and a plurality of large-sized tri-layer pieces 443L, distributed in accordance with a lowest density. The highest density of the small-sized tri-layer pieces 443S is, for example, about 9-12 pcs/cm2; the middle density of the medium-sized tri-layer pieces 443M is, for example, about 8-9 pcs/cm2; and the lowest density of the large-sized tri-layer pieces 443L is, for example, about 3-5 pcs/cm2.

The large-sized tri-layer pieces 443L can have a geometric shape in the plane of the fabric substrate that is distinct from a geometric shape of at least the small-sized tri-layer pieces 443S and the medium-sized tri-layer pieces 443M.

What is claimed is:

1. A sparkling fabric comprising:
   a fabric substrate; and
   a tri-layer adhered to the fabric substrate, the tri-layer distributed across the fabric substrate as a plurality of identifiable tri-layer pieces, with each tri-layer piece being separate from each other tri-layer piece, and each and every tri-layer piece of the sparkling fabric comprising:
      an adhesive layer including adhesive that adheres the tri-layer to the fabric substrate;
      an exposed design layer made up of pieces of a design layer of a sparkling foil paper; and
      a metal plating layer made up of pieces of an outer layer of the sparkling foil paper, the metal planting layer being sandwiched between the exposed design layer and the adhesive layer such that the metal plating layer is entirely covered by the exposed design layer; and
   wherein each tri-layer piece has a shape that corresponds to a shape of the adhesive in the adhesive layer in the tri-layer piece; and the tri-layer is distributed across the fabric substrate.

2. The sparkling fabric of claim 1, wherein the fabric substrate extends along a plane, the thickness of the tri-layer along a direction perpendicular to the plane is less than 10 µm.

3. The sparkling fabric of claim 2, wherein the thickness of the exposed design layer is less than 5 µm and the thickness of the metal plating layer is less than 5 µm.

4. The sparkling fabric of claim 2, wherein the thickness of the tri-layer at each location on the plane is within 1 µm of an acceptable thickness value of the tri-layer.

5. The sparkling fabric of claim 1, wherein the fabric substrate is a satin or a tricot.

6. The sparkling fabric of claim 1, wherein the metal plating layer includes a layer of aluminum having a luster.

7. The sparkling fabric of claim 1, wherein the sparkling fabric lacks glitter.

8. The sparkling fabric of claim 1, wherein the tri-layer covers about 25-35% of the fabric substrate.

9. The sparkling fabric of claim 1, wherein the tri-layer includes a distribution of at least three different sizes of tri-layer pieces as follows:
   a plurality of small-sized tri-layer pieces, distributed in accordance with a highest density;
   a plurality of medium-sized tri-layer pieces, distributed in accordance with a middle density; and
   a plurality of large-sized tri-layer pieces, distributed in accordance with a lowest density.

10. The sparkling fabric of claim 9, wherein:
    the highest density of the small-sized tri-layer pieces is about 9-12 pcs/cm$^2$;
    the middle density of the medium-sized tri-layer pieces is about 8-9 pcs/cm$^2$; and
    the lowest density of the large-sized tri-layer pieces is about 3-5 pcs/cm$^2$.

11. The sparkling fabric of claim 9, wherein the large-sized tri-layer pieces have a geometric shape in the plane of the fabric substrate that is distinct from a geometric shape of at least the small-sized tri-layer pieces and the medium-sized tri-layer pieces.

12. The sparkling fabric of claim 1, wherein the adhesive layer is made of an adhesive that is 50% adhesive, 40% butanone, and 10% curing agent, by weight.

13. The sparkling fabric of claim 1, wherein the exposed design layer includes pieces of geometric forms of the design layer of the sparkling foil paper, the geometric forms having a plurality of different colors.

14. The sparkling fabric of claim 13, wherein the exposed design layer includes pieces of a circle, a dot, or a polygon.

15. The sparkling fabric of claim 1, wherein the exposed design layer has a metallic luster.

16. The sparkling fabric of claim 1, wherein a size of each tri-layer piece is less than 1 millimeter (mm).

17. A sparkling fabric comprising:
    a fabric substrate; and
    a tri-layer adhered to the fabric substrate, the tri-layer distributed across the fabric substrate as a plurality of identifiable tri-layer pieces, with each tri-layer piece being separate from each other tri-layer piece, and each tri-layer piece comprising:

an adhesive layer including adhesive that adheres the tri-layer to the fabric substrate;
an exposed design layer; and
a metal plating layer between the exposed design layer and the adhesive layer;
wherein the tri-layer is distributed across the fabric substrate such that the distribution of tri-layer pieces has a density on the order of 15-25 pieces per centimeter squared (pcs/cm$^2$) and a size of a tri-layer piece is less than 1 millimeter (mm).

18. The sparkling fabric of claim 17, wherein the sparkling fabric lacks glitter.

19. The sparkling fabric of claim 17, wherein the exposed design layer is made up of pieces of a design layer of a sparkling foil paper.

* * * * *